(12) United States Patent
Hagfors et al.

(10) Patent No.: US 8,568,567 B2
(45) Date of Patent: Oct. 29, 2013

(54) SHOE PRESS BELT

(75) Inventors: Satu Hagfors, Ylöjärvi (FI); Vesa-Matti Riihioja, Tampere (FI); Marja Ojanen, Pirkkala (FI)

(73) Assignee: Metso Fabrics Inc., Tampere (FI)

( * ) Notice: Subject to any disclaimer, the term of this patent is extended or adjusted under 35 U.S.C. 154(b) by 29 days.

(21) Appl. No.: 13/131,786

(22) PCT Filed: Dec. 10, 2009

(86) PCT No.: PCT/FI2009/050995
§ 371 (c)(1),
(2), (4) Date: Jun. 24, 2011

(87) PCT Pub. No.: WO2010/066950
PCT Pub. Date: Jun. 17, 2010

(65) Prior Publication Data
US 2012/0132384 A1    May 31, 2012

(30) Foreign Application Priority Data
Dec. 12, 2008 (FI) ...................................... 20086190

(51) Int. Cl.
*D21F 3/02* (2006.01)
(52) U.S. Cl.
USPC ...................................... 162/358.4; 162/901
(58) Field of Classification Search
CPC .... D21F 3/0218; D21F 3/0227; D21F 3/0236
USPC ................. 162/306, 358.4, 901, 358.1, 358.2
See application file for complete search history.

(56) References Cited

U.S. PATENT DOCUMENTS

| 5,134,010 A | 7/1992 | Schiel |
| 5,609,811 A | 3/1997 | Jermo |
| 5,833,898 A | 11/1998 | Dutt |
| 6,465,074 B1 | 10/2002 | FitzPatrick et al. |
| 7,955,475 B2 * | 6/2011 | Yazaki et al. ............... 162/358.4 |
| 2003/0232954 A1 * | 12/2003 | Gajewski ........................ 528/59 |
| 2005/0208288 A1 * | 9/2005 | Li et al. ...................... 428/304.4 |
| 2007/0243964 A1 | 10/2007 | Hagfors et al. |

FOREIGN PATENT DOCUMENTS

| CA | 2687552 | * 11/2008 | ................ D21F 3/02 |
| DE | 196 51 557 A1 | 6/1998 | |
| DE | 197 02 138 A1 | 7/1998 | |
| EP | 0 877 118 A2 | 11/1998 | |
| EP | 0 939 162 A2 | 9/1999 | |
| EP | 1 136 618 A2 | 9/2001 | |
| EP | 1 338 696 A1 | 8/2003 | |
| FI | 20075517 | 1/2009 | |
| WO | WO 94/13722 A1 | 6/1994 | |
| WO | WO 98/56841 A1 | 12/1998 | |
| WO | WO 2005/090429 A1 | 9/2005 | |
| WO | WO 2007/042623 A1 | 4/2007 | |
| WO | WO 2009/004122 A1 | 1/2009 | |

OTHER PUBLICATIONS

Jae Heung Yang et al., "Comparison of thermal/mechanical properties and shaped memory effect of polyurethane block-copolymers with planar or bent shaped of hard segment", Mar. 27, 2003, pp. 3251-3258, Polymer 44.
Nov. 8, 2010 International Search Report issued in PCT/FI2009/050995.
Mar. 31, 2011 International Preliminary Report on Patentability issued in PCT/FI2009/050995.

* cited by examiner

*Primary Examiner* — Eric Hug
(74) *Attorney, Agent, or Firm* — Oliff & Berridge, PLC

(57) ABSTRACT

The invention relates to a shoe press belt comprising polyurethane polymer prepared of a urethane prepolymer containing isocyanate groups and a chain extender, the urethane prepolymer being prepared using 1,4-phenylene-diisocyanate (PPDI) and the chain extender comprising methyl-bis(3-chloro-2,6-diethylaniline) (MCDEA).

5 Claims, No Drawings

SHOE PRESS BELT

BACKGROUND OF THE INVENTION

The invention relates generally to belts used in different phases of a papermaking process. More particularly, the invention relates to shoe press belts used in shoe presses of press sections in board, paper and pulp machines, as well as in shoe presses of a paper machine calender when manufacturing certain types of paper.

Shoe presses are commonly used in pulp, cardboard and paper machines for dewatering a fibre web. One surface of a wet fibre web travelling at a high speed in such shoe presses is pressed by a rotating press roll while simultaneously the other surface of the fibre web is pressed by a stationary pressure shoe surrounded by an endless belt loop having an elastic elastomer body. The belt travels between the press roll and the pressure shoe at approximately the same speed as the fibre web. The fibre web on top of a press felt is driven through the shoe press with the outer surface of the press belt in direct contact with the press felt and the inner surface of the press belt gliding against the pressure shoe. Lubricating oil is typically provided between the belt and the pressure shoe to guarantee free movement of the belt.

Prior art press belts typically contain an elastomer material, such as a polyurethane or rubber, and a support structure made of yarn inside the belt. An example of a shoe press belt is disclosed in patent application FI 20040166.

Generally speaking a shoe press belt is subjected to recurrent high flexing and pressing forces between a press roll and a pressure shoe as the fibre web travels at a high speed through the shoe presses. In the course of time such strains may cause the belt material to crack during use, which will eventually damage the belt beyond usability. A general trend has been to increase the web speed in paper machines to improve manufacturing efficiency. Since the same dry matter content as before is aimed at with the higher speed, pressing force must be increased. Hence also shoe press belts used in the pressing steps are subjected to increasingly higher loads, the belts being thus required to possess a plurality of various properties in order to ensure high performance. As web speeds in paper machines increase, the belt is subjected to an ever higher thermal load due to the increased speed, on the one hand, and the warming of the lubricating oil on the other hand. A good heat resistance of the belt is an essential aspect in view of the service life of the belt.

The operating temperatures of shoe presses in paper, board and pulp machines are usually below 70° C. Lately it has been observed that manufacturing efficiency can be increased also by raising the temperature of the shoe presses; higher fibre web temperature may allow a better dry matter content to be achieved as water viscosity decreases and water exits more efficiently. The fibre web may be heated by means of steam, a hot roll or by raising the temperature of the mass, for example. In what is known as an impulse drying technique the temperature is raised to as high as over 200° C. Also in what are known as shoe calenders the temperature of the hot roll may be over 200° C. The same factors raise the temperature of the shoe press belt from the outside. Increasing of the pressure load improves the dry matter. At the same time, however, heat caused by friction heats the oil lubricating the shoe and raises temperature inside the shoe press belt. These factors together increase the heat resistance requirements directed to the shoe press felt.

Shoe press belts made of ordinary polyurethane sustain well temperatures below 70° C. However, at higher temperatures the mechanical and dynamical characteristics of polyurethane and, correspondingly, those of the shoe press belt deteriorate clearly. Polyurethane softens at a high temperature and the wearing of the belt increases. Due to the softening the belt grooves become compressed and do not return to their original shape, which impairs dewatering because the grooves are no longer able take enough water. At a high temperature, and particularly in the presence of residues of paper manufacturing chemicals, thermal and chemical oxidation reactions start to take place in the polyurethane, causing polymer chains to break. This breaking of the chains in turn deteriorates the properties of the polyurethane, which then seen as wearing of the belt and as weakening of break resistance. At its location of use, the shoe press belt is under constant dynamic pressing and tensile load. This is why it is important that its dynamic properties remain good in this temperature range.

Belts suitable for shoe presses have been described abundantly in the art. EP 1338696 A1, for example, discloses a belt, such as a shoe press belt, suitable for the pressing steps in a papermaking process, the belt comprising a reinforcing substrate embedded in a polyurethane layer. The outer peripheral surface of the belt, which is in direct contact with a press felt supporting the fibre web, is formed of a urethane prepolymer and dimethylthiotoluenediamine (DMTDA) as a hardener. The belt aims at decreasing or slowing down cracking, if any, which generally occurs on outer surfaces of the belts in particular, as well as at preventing delamination between the hardener and the polyurethane layer.

EP 877118 A2 discloses a shoe press belt with a base layer and a resin layer on both sides thereof. The resin is made of a toluene diisocyanate polyether type urethane prepolymer, with 4,4'-methylene bis(2-chloroaniline) (MOCA/MBOCA) as a chain extender. The belt is mentioned to provide the required resistance to wear, flex fatigue strength and cracking prevention.

WO 2005/090429 A1 discloses a belt suitable for a shoe press, the belt comprising a urethane-based coating containing nanoparticles. The aim in adding nanoparticles to the coating is, for example, to improve the belt's resistance to flex fatigue and crack propagation, and to provide the belt with hardness and wear characteristics.

EP 0939162 A2 discloses a shoe press belt comprising two resin layers made of a toluene diisocyanate polyether type urethane prepolymer, with 3,3'-dichloro-4,4'-diaminodiphenylmethane (MOCA/MBOCA) as a reinforcing substrate. The aim is to obtain a belt providing strength both in machine and in cross machine direction and to prevent delamination of resin from the belt.

A problem with the above disclosed shoe press belts is that their heat resistance is not sufficient in the production rates ever increasingly preferred in board, paper and pulp machines for maximum manufacturing efficiency.

A solution disclosed in EP 1136618 A2 with the view of an increase in the temperature during the operation of a pressure belt is to use an insulating filler agent. Likewise, DE 19702138 A1 proposes to improve heat resistance of press belts by using heat conducting filler particles in an elastomer matrix. In DE 19651557 A1 a press belt is provided with a coating that protects the elastomer underneath both from chemicals and heat.

However, solutions of the above type, which are based on the use of filler agents or a coating, may cause other problems in the belts. The polymer material may become brittled or delaminate from the reinforcing substrate because of the filler agent. In long-term use of the belt in particular, problems may also arise in the adhesion of the coating to the belt material.

It is therefore desirable to obtain, in a yet simpler manner, shoe press belts which have a good heat resistance and are free of the prior art problems, and which maintain their good dynamic and mechanical properties in a wider operating temperature range and at higher temperatures in particular.

BRIEF DESCRIPTION OF THE INVENTION

It is an object of the invention to provide a shoe press belt that meets the special requirements set by modern board, paper and pulp machines with regard to good heat resistance. This is achieved by a shoe press belt characterized by what is stated in the independent claim.

It was surprisingly discovered that the use of starting materials of a specific type, i.e. a particular isocyanate monomer and a particular chain extender, in the manufacture of polyurethane for a shoe press belt allowed the heat resistance of the belt to be improved. One indication of the improved heat resistance of the belt is that it maintains its break resistance. At the same time, the specific starting materials also improve other characteristics, such as resistance to wear and compression resilience, of the polyurethane belt.

One of the advantages of the shoe press belt of the invention is that the good heat resistance extends the service life of the belt essentially.

DETAILED DISCLOSURE OF THE INVENTION

The invention provides a novel shoe press belt for use, characterized in that it comprises polyurethane polymer prepared of a urethane prepolymer containing isocyanate groups and a chain extender, the urethane prepolymer being prepared using 1,4-phenylene-diisocyanate (PPDI) and the chain extender comprising methyl-bis(3-chloro-2,6-diethylaniline) (MCDEA). MCDEA is also known in the art as 4,4'-methylene-bis(3-chloro-2,6-diethylaniline).

The polyurethane polymer used in the shoe press belt of the invention is prepared in a manner known per se. The polyurethane may be either pourable or extrudable. The polyurethane may be prepared using prepolymerization techniques known in the art, in which case the prepolymerization may be carried out either partly (by what is known as a quasi-prepolymer technique) or completely (by what is known as a full prepolymer technique). In the present invention the polyurethane is prepared by mixing urethane prepolymer amine groups ($NH_2$—) having isocyanate groups at the ends thereof with a chain extender. The chain extender causes the prepolymer chain to extend by combining long prepolymer chains together, whereby urethane or urea bonds are formed and a linear polyurethane structure is obtained that may further react to form a network structure with biuret, allophanate and hydrogen bonds.

In the context of this invention, urethane prepolymer refers to a product obtained from a reaction between said 1,4-phenylene-diisocyanate monomer (PPDI) and polyol.

Use of PPDI in the preparation of polyurethanes is widely known. According to a study, PPDI may be used for preparing prepolymers in which the proportion of free isocyanate (NCO) groups is smaller than before. Using prepolymers containing fewer free NCO groups enables to reduce exposure to volatile and toxic gases caused by inert, i.e., free isocyanate monomers.

It has also been observed that polyurethane prepared of PPDI has better characteristics than polyurethane made of 2,2'-diphenylmethane-diisocyanate (MDI). According to a study the better properties are due to the planar structure of PPDI (Yang et al., Polymer 44 (2003), pp. 3251-3258). Spatial structures of PPDI and MDI are illustrated below.

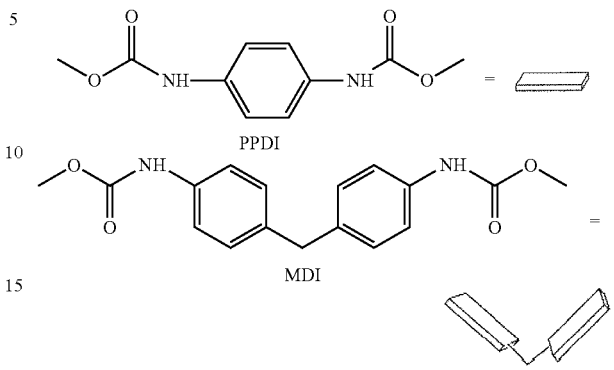

Because of the symmetry of a PPDI monomer, a formation of a linear and tight multiple phase structure formed of hard and soft blocks is observed in the polyurethane elastomer. The phase separation between the hard and soft blocks is considered as the most important reason for the excellent properties of PPDI polyurethane elastomers and particularly for the improvement in dynamic performance.

For preparing the urethane prepolymer according to the present invention, PPDI is reacted with polyol. The polyol may be any polyol commonly used in the preparation of polyurethanes. Hence the polyol may be polyether polyol, polyester polyol, polyether carbonate polyol, polycarbonate polyol or polycaprolactam polyol. Polyether polyols include, but are not restricted to, polytetramethylene ether glycol (PTMEG), polypropylene glycol (PPG), polyethylene glycol (PEG), polyhexamethylene ether glycol; polyester polyols include polyadipate of a monoethylene glycol and polycaprolactone; the polyether carbonate polyols may be for example of the form $H[O-(CH_2)_6]_n-O-CO-O-[(CH_2)_6-O]_n-(CH_2)_6-O-CO-O-\ldots-OH$, although they are not restricted to this; the polycarbonate polyols may be for example of the form $HO-[(CH_2)_6-O-CO-O]_n-(CH_2)_6-OH$, although they are not restricted to this. According to an embodiment of the invention, the urethane prepolymer is prepared using PTMEG as the polyol. According to a second embodiment, polyether carbonate polyols are used as the polyol.

According to the invention, the polyurethane polymer is prepared by mixing the urethane prepolymer having isocyanate groups at the ends thereof with the chain extender comprising methyl-bis(3-chloro-2,6-diethyl aniline) (MCDEA) containing amine groups, whereby long polyurethane chains with urea and urethane bonds are obtained.

A discovery made in the invention was that a chain extender containing symmetrical MCDEA used in the preparation of polyurethane, in addition to symmetrical PPDI, provided a shoe press belt made of such polyurethane with excellent heat resistance qualities. The symmetrical structure of MCDEA can be seen in the formula below. Without any commitment to a particular theory, it can be concluded that the selection of said symmetrical starting agents leads to a polyurethane elastomer with a preferred, extremely well organized phase structure of hard and soft phases, which renders the material particularly heat resistant. The results below surprisingly show that heat does not weaken the strength of the material over time but even improves it. This may be assumed to imply that there is a tendency in the material towards an increasingly organized structure by the impact of heat.

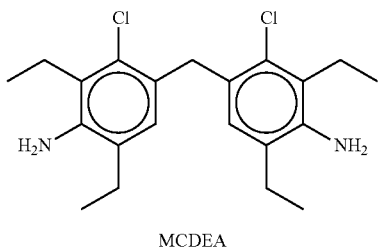

MCDEA

According to an embodiment of the invention the chain extender comprises 1 to 100% by weight of MCDEA. According to a second embodiment the chain extender comprises more than 25% by weight of MCDEA.

The shoe press belt of the invention is suitable for shoe presses of all types. A shoe press of a kind is disclosed in FI application 20055556.

The support structure of the invention may typically comprise monofilament or multifilament yarns made of for example polyamide, polypropene, polyethene, polyester, polyvinyl alcohol or high temperature resistant fibre materials, such as polyaramide, polyphenylene sulphide or polyetheretherketone.

The shoe press belt of the invention may be manufactured in a manner known per se. For example, the belt may be manufactured using what is known as a centrifugal cylinder casting with the cross-machine and machine direction reinforcement yarns being first placed on the inner surface of the casting cylinder and, as the drum rotates, the polyurethane material is spread uniformly around the yarns and on top of them. This kind of belt manufacturing technique is disclosed in U.S. Pat. No. 5,609,811, for example.

The shoe press belt of the invention may also be made by casting the belt onto a casting cylinder. This kind of method is disclosed in U.S. Pat. No. 5,134,010, for example. The method starts with the machine direction reinforcement yarns being attached onto a casting cylinder, elastomer material being then cast onto the cylinder as it rotates and, at the same time, circumferential reinforcement yarn is being coiled onto the machine direction yarns.

Yet another possibility of manufacturing the shoe press belt of the invention is to impregnate a base fabric with polyurethane in a cylindrical mold, the base fabric being placed between the outer shell of the mold and a mandrel. The mold is subjected to suction to produce a negative pressure, and the polyurethane material is then injected into the mold. The polyurethane material thus becomes uniformly absorbed into the base fabric. This type of method is described in U.S. Pat. No. 5,833,898, for example.

The shoe press belt of the invention may also be manufactured by impregnation and/or by coating an endless woven, plaited or laminated reinforcing structure with polymer on both sides. This type of method is disclosed in U.S. Pat. No. 6,465,074, for example.

The excellent heat resistance of the shoe press belt of the invention is illustrated in the results collected into table 1 below. Sample 1 represents a shoe press belt of the invention with polyurethane being made of a prepolymer formed of a polyol of PPDI and PTMEG and a chain extender containing MCDEA. The proportion of MCDEA is 50% of the chain extender mixture. The polyurethane was prepared at a processing temperature of 66° C. Post-treatment of the belt in a furnace took place for 16 hours at 120° C. The proportion of isocyanate groups in the prepolymer was 5.52%.

Sample 2 is a reference belt in which the polyurethane is made of a prepolymer formed of 2,2'-diphenylmethane-diisocyanate (MDI) and PTMEG polyol and a chain extender containing MOCA. The proportion of MOCA in the chain extender mixture is 25%. The polyurethane was prepared at a processing temperature of 45° C. The post-treatment of the belt in a furnace took place for 24 hours at 80° C. The proportion of isocyanate groups in the prepolymer was 13.15%.

The residual strength, wear and residual compression of the belts were measured within 0 to 4 days. The residual strength was tested according to SFS standard 2983, wear according to DIN 53516 and residual compression according to SFS2564/ISO 815-1972. The exposure temperature of the belts was 130° C.

TABLE 1

| | Residual strength, % | | Wear, mg | | Residual compression, % | |
|---|---|---|---|---|---|---|
| | Sample 1 | Sample 2 | Sample 1 | Sample 2 | Sample 1 | Sample 2 |
| 0 days | 100 | 100 | 24 | 37 | 28 | 42 |
| 1 days | 107 | 55 | 22 | 61 | 28 | 46 |
| 4 days | 122 | 54 | 21 | 62 | 28 | 37 |

The results show that the strength of sample 1 does not weaken in heat exposure but, on the contrary, tends to increase. Then again the strength of sample 2 becomes substantially weaker already in a temperature exposure of 1 day. Resistance to wear and resilience after compression of sample 1 do not decrease either in temperature exposure. Compared with sample 2, sample 1 has substantially better resistance to wear and resilience after compression already before temperature exposure.

A person skilled in the art will find it obvious that as technology advances the basic idea of the invention may be implemented in various ways. The invention and its embodiments are therefore not restricted to the above examples but may vary within the scope of the claims.

The invention claimed is:

1. A shoe press belt comprising polyurethane polymer prepared of a urethane prepolymer containing isocyanate groups and a blend of chain extenders, the urethane prepolymer being prepared using 1,4-phenylene-diisocyanate (PPDI) and the blend of chain extenders comprising methyl-bis(3-chloro-2,6-diethylaniline) (MCDEA).

2. A shoe press belt according to claim 1, wherein the chain extender comprises at least 10% by weight of MCDEA.

3. A shoe press belt according to claim 1, wherein the chain extender comprises more than 25% by weight of MCDEA.

4. A shoe press belt according to claim 1, wherein the urethane prepolymer is made of 1,4-phenylene-diisocyanate and polytetramethylene ether glycol (PTMEG).

5. A shoe press belt according to claim 1, wherein the urethane prepolymer is made of 1,4-phenylene-diisocyanate and polyether carbonate polyol.

* * * * *